(12) United States Patent
Chiba et al.

(10) Patent No.: US 10,182,377 B2
(45) Date of Patent: Jan. 15, 2019

(54) METHOD, APPARATUS AND SYSTEM FOR HANDOVER IN WIRELESS COMMUNICATIONS

(71) Applicant: Nokia Solutions and Networks Oy, Espoo (FI)

(72) Inventors: Tsunehiko Chiba, Saitama (JP); Srinivasan Selvaganapathy, Bangalore (IN); Yang Liu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/547,153

(22) PCT Filed: Jan. 27, 2016

(86) PCT No.: PCT/EP2016/051626
§ 371 (c)(1),
(2) Date: Jul. 28, 2017

(87) PCT Pub. No.: WO2016/124455
PCT Pub. Date: Aug. 11, 2016

(65) Prior Publication Data
US 2018/0014231 A1  Jan. 11, 2018

(30) Foreign Application Priority Data

Feb. 3, 2015 (IN) .............................. 530/CHE/2015

(51) Int. Cl.
*H04W 76/15* (2018.01)
*H04W 36/08* (2009.01)
(Continued)

(52) U.S. Cl.
CPC ....... *H04W 36/0077* (2013.01); *H04W 36/08* (2013.01); *H04W 76/15* (2018.02); *H04W 92/20* (2013.01)

(58) Field of Classification Search
CPC ...... H04W 36/00; H04W 36/08; H04W 36/06
See application file for complete search history.

(56) References Cited

U.S. PATENT DOCUMENTS

2009/0196168 A1* 8/2009 Aydin ............... H04W 36/0055
370/216
2009/0286541 A1* 11/2009 Maheshwari ......... H04W 76/10
455/436

(Continued)

FOREIGN PATENT DOCUMENTS

EP     2802183 A1   11/2014

OTHER PUBLICATIONS

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 3GPP TR 36.842, V1.0.0, Nov. 2013, 69 pages.

(Continued)

Primary Examiner — Asghar H Bilgrami
(74) Attorney, Agent, or Firm — NokiaTechnologies Oy

(57) ABSTRACT

A method comprising: receiving at a source serving node (505) an identifier associated with a group of random access channel preambles for allocation by the source serving node (505), the group of random access channel preambles having been reserved at a serving node (503) from available random access channel preambles for the serving node (503); allocating at least one from the group of random access channel preambles, in response to determining a handover from the source serving node (505) to a target serving node (507); and transmitting (515) a message to the target serving node (507), the message comprising the at least one from the group of random access channel preambles.

19 Claims, 4 Drawing Sheets

(51) Int. Cl.
*H04W 92/20* (2009.01)
*H04W 36/00* (2009.01)

(56) References Cited

U.S. PATENT DOCUMENTS

| | | | | |
|---|---|---|---|---|
| 2014/0301371 | A1* | 10/2014 | Maeda | H04W 36/0011 370/331 |
| 2015/0111580 | A1* | 4/2015 | Wu | H04W 36/0005 455/436 |
| 2015/0172988 | A1* | 6/2015 | Lai | H04W 36/0077 455/436 |
| 2016/0057663 | A1* | 2/2016 | Teyeb | H04W 36/0027 455/436 |
| 2016/0249259 | A1* | 8/2016 | Park | H04W 36/00 |
| 2016/0295613 | A1* | 10/2016 | Wager | H04L 41/0813 |
| 2017/0142618 | A1* | 5/2017 | Hahn | H04W 36/0027 |
| 2017/0150404 | A1* | 5/2017 | Maeda | H04W 36/0011 |
| 2017/0181044 | A1* | 6/2017 | Wen | H04W 36/0027 |
| 2017/0318500 | A1* | 11/2017 | Horn | H04W 28/08 |
| 2017/0332321 | A1* | 11/2017 | Zhang | H04W 52/0206 |

OTHER PUBLICATIONS

"Revised Work Item Description: Dual Connectivity for LTE", 3GPP TSG RAN Meeting #65, RP-141266, Agenda Item: 11.7.9, NTT DOCOMO, Sep. 9-12, 2014, 8 pages.

"Introduction of Dual Connectivity", 3GPP TSG-RAN WG2 Meeting #88, R2-144660, NTT DOCOMO, Nov. 17-21, 2014, 70 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300, V12.4.0, Dec. 2014, pp. 1-251.

International Search Report and Written Opinion received for corresponding Patent Cooperation Treaty Application No. PCT/EP2016/051626, dated Apr. 5, 2016, 13 pages.

"Handover Enhancement for Dual Connectivity", 3GPP TSG-RAN WG3 Meeting #87, R3-150098, Agenda item: 20.3, Nokia Networks, Feb. 9-13, 2015, 4 pages.

"Analysis Of Inter-MeNB Handover Without SeNB Change", 3GPP TSG-RAN WG3 Meeting #87, R3-150329, Agenda Item: 20.3, Ericsson, Feb. 9-13, 2015, pp. 1-4.

* cited by examiner

METHOD, APPARATUS AND SYSTEM FOR HANDOVER IN WIRELESS COMMUNICATIONS

RELATED APPLICATION

This application was originally filed as Patent Cooperation Treaty Application No. PCT/EP2016/051626 filed Jan. 27, 2016 which claims priority benefit to Indian Patent Application No. 530/CHE/2015, filed Feb. 3, 2015.

BACKGROUND

The present application relates to a method, apparatus and system and in particular but not exclusively, to dual connectivity in mobile communications.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases.

SUMMARY

According to a first aspect there is provided a method comprising: receiving at a source serving node an identifier associated with a group of random access channel preambles for allocation by the source serving node, the group of random access channel preambles having been reserved at a serving node from available random access channel preambles for the serving node; allocating at least one from the group of random access channel preambles, in response to determining a handover from the source serving node to a target serving node; transmitting a message to the target serving node, the message comprising the at least one from the group of random access channel preambles.

The method may further comprise: receiving from the target serving node a response message from the target serving node, the response message comprising a security key; and transmitting the security key to the serving node.

Receiving at a source serving node the identifier may comprise receiving the identifier within an operations, administration and management configuration message.

Receiving at a source serving node the identifier may comprise receiving the identifier within an X2 interface message from the serving node.

According to a second aspect there is provided a method comprising: reserving from available radio resources for a serving node a group of random access channel preambles for allocation by a source serving node; transmitting an identifier associated with the group of random access channel preambles to the source serving node such that the source serving node is able to allocate at least one from the group of random access channel preambles, in response to determining a handover from the source serving node to a target serving node without further communicating with the serving node.

Transmitting the identifier associated with the group of random access channel preambles to the source serving node may comprise transmitting the identifier within an operations, administration and management configuration message.

Transmitting the identifier associated with the group of random access channel preambles to the source serving node may comprise transmitting the identifier within an X2 interface message from the serving node.

The serving node may be a secondary enhanced node B within a secondary cell group.

The serving node may be configured to provide data offloading with a user equipment.

The source serving node may be a source master enhanced node B and the target serving node may be a target master enhanced node B, both of which being within a master cell group.

The source serving node may be configured to provide a radio-signalling connection with a user equipment being served by the source serving node.

The target serving node may be configured to provide a radio-signalling connection with a user equipment being served by the source serving node following the handover between the source serving node and the target serving node.

The handover may be an inter master enhanced node B handover.

The handover may be an intra master enhanced node B handover.

The method may further comprise determining a dual connectivity mode of operation for a user equipment, the user equipment configured to use the serving node as a secondary node of connectivity and the source serving node as a master node of connectivity.

According to a third aspect there is provided an apparatus comprising: receiving means for receiving at a source serving node an identifier associated with a group of random access channel preambles for allocation by the source serving node, the group of random access channel preambles having been reserved at a serving node from available random access channel preambles for the serving node; allocating means for allocating at least one from the group of random access channel preambles, in response to determining a handover from the source serving node to a target serving node; transmitting means for transmitting a message to the target serving node, the message comprising the at least one from the group of random access channel preambles.

The receiving means may comprise means for receiving from the target serving node a response message from the target serving node, the response message comprising a security key; and transmitting the security key to the serving node.

The receiving means may comprise means for receiving the identifier within an operations, administration and management configuration message.

The receiving means may comprise means for receiving the identifier within an X2 interface message from the serving node.

According to a fourth aspect there is provided an apparatus comprising: reserving means for reserving from available radio resources for a serving node a group of random access channel preambles for allocation by a source serving node; transmitting means for transmitting an identifier associated with the group of random access channel preambles to the source serving node such that the source serving node is able to allocate at least one from the group of random access channel preambles, in response to determining a handover from the source serving node to a target serving node without further communicating with the serving node.

The transmitting means may comprise means for transmitting the identifier within an operations, administration and management configuration message.

The transmitting means may comprise means for transmitting the identifier within an X2 interface message from the serving node.

The serving node may be a secondary enhanced node B within a secondary cell group.

The serving node may be configured to provide data offloading with a user equipment.

The source serving node may be a source master enhanced node B and the target serving node may be a target master enhanced node B, both of which being within a master cell group.

The source serving node may be configured to provide a radio-signalling connection with a user equipment being served by the source serving node.

The target serving node may be configured to provide a radio-signalling connection with a user equipment being served by the source serving node following the handover between the source serving node and the target serving node.

The handover may be an inter master enhanced node B handover.

The handover may be an intra master enhanced node B handover.

The apparatus may further comprise means for determining a dual connectivity mode of operation for a user equipment, the user equipment configured to use the serving node as a secondary node of connectivity and the source serving node as a master node of connectivity.

According to a fifth aspect, there is provided an apparatus, said apparatus comprising at least one processor and at least one memory including computer code for one or more programs, the at least one memory and the computer code configured, with the at least one processor, to cause the apparatus at least to: receive at a source serving node an identifier associated with a group of random access channel preambles for allocation by the source serving node, the group of random access channel preambles having been reserved at a serving node from available random access channel preambles for the serving node; allocate at least one from the group of random access channel preambles, in response to determining a handover from the source serving node to a target serving node; transmit a message to the target serving node, the message comprising the at least one from the group of random access channel preambles.

The apparatus may be further caused to: receive from the target serving node a response message from the target serving node, the response message comprising a security key; and transmitting the security key to the serving node.

Receiving at a source serving node the identifier may cause the apparatus to receive the identifier within an operations, administration and management configuration message.

Receiving at a source serving node the identifier may cause the apparatus to receive the identifier within an X2 interface message from the serving node.

According to a sixth aspect there is provided an apparatus, said apparatus comprising at least one processor and at least one memory including computer code for one or more programs, the at least one memory and the computer code configured, with the at least one processor, to cause the apparatus at least to: reserve from available radio resources for a serving node a group of random access channel preambles for allocation by a source serving node; transmit an identifier associated with the group of random access channel preambles to the source serving node such that the source serving node is able to allocate at least one from the group of random access channel preambles, in response to determining a handover from the source serving node to a target serving node without further communicating with the serving node.

Transmitting the identifier associated with the group of random access channel preambles to the source serving node may cause the apparatus to transmit the identifier within an operations, administration and management configuration message.

Transmitting the identifier associated with the group of random access channel preambles to the source serving node may cause the apparatus to transmit the identifier within an X2 interface message from the serving node.

The serving node may be a secondary enhanced node B within a secondary cell group.

The serving node may be configured to provide data offloading with a user equipment.

The source serving node may be a source master enhanced node B and the target serving node may be a target master enhanced node B, both of which being within a master cell group.

The source serving node may be configured to provide a radio-signalling connection with a user equipment being served by the source serving node.

The target serving node may be configured to provide a radio-signalling connection with a user equipment being served by the source serving node following the handover between the source serving node and the target serving node.

The handover may be an inter master enhanced node B handover.

The handover may be an intra master enhanced node B handover.

The apparatus may be further caused to determine a dual connectivity mode of operation for a user equipment, the user equipment configured to use the serving node as a secondary node of connectivity and the source serving node as a master node of connectivity.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
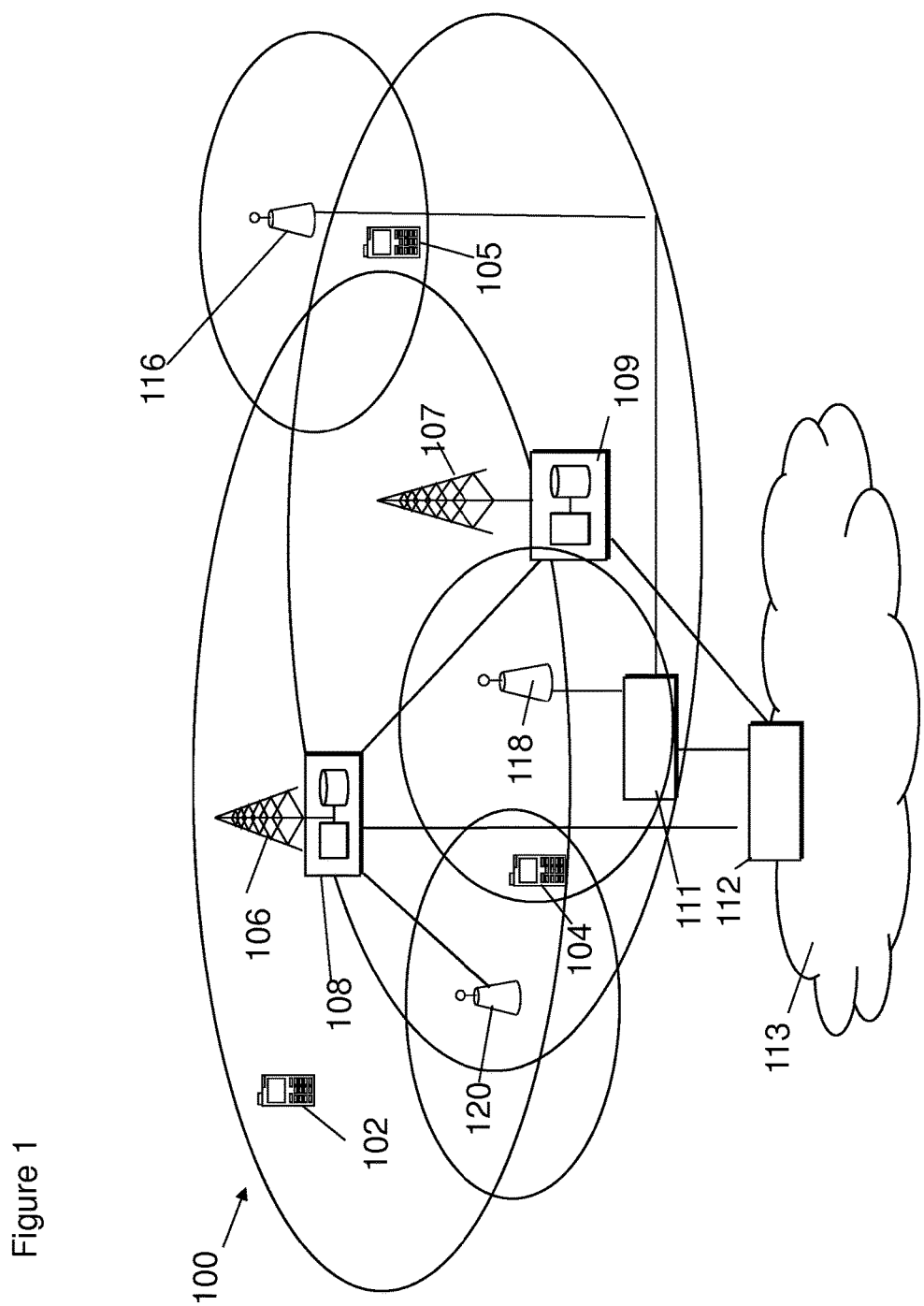
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller (RNC). In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller. The control apparatus may provide an apparatus such as that discussed in relation to FIG. 3.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane (U-plane) core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
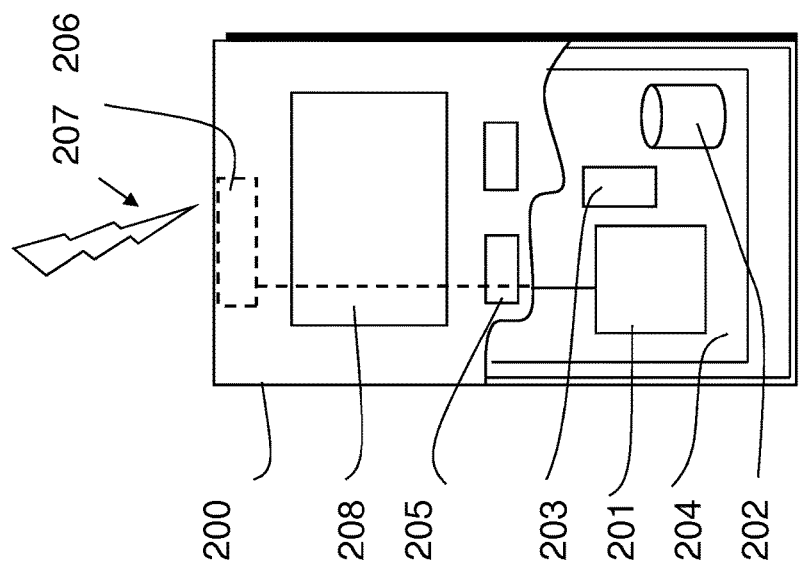
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Figure 3:
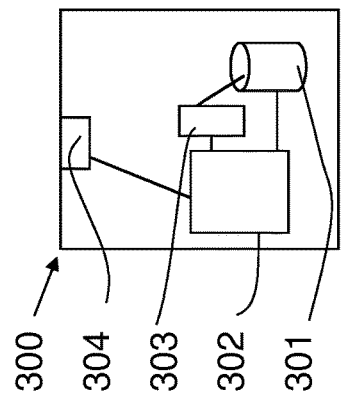
FIG. 3 shows a schematic diagram, of an example control apparatus for the communication system shown in FIG. 1.

FIG. 3 shows an example of a control apparatus for a communication system, for example to be coupled to and/or for controlling a station of an access system, such as a base station or (e) node B, or a server or host. In some embodiments, base stations comprise a separate apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions.

For example in some embodiments the control apparatus such as a source master eNB (S-MeNB) or more generically a source serving node may be configured to receive an identifier associated with a group of random access channel preambles for allocation by the S-MeNB, the group of random access channel preambles having been reserved at a secondary eNB (S-eNB) or more generically a serving node from available random access channel preambles for the S-eNB. Furthermore the control apparatus may further be configure to allocate at least one from the group of random access channel preambles, in response to determining a handover from the S-MeNB to a target master eNB (T-MeNB) or more generically a target serving node. Also the control apparatus may be configured to then transmit a message to the T-MeNB, the message comprising the at least one from the group of random access channel preambles.

The control apparatus may further be configured to receive from the target serving node a response message from the target serving node, the response message comprising a security key; and transmitting the security key to the serving node.

Furthermore in some embodiments the control apparatus such as a secondary eNB (SeNB) or more generically serving node may be configured to reserve from available radio resources a group of random access channel preambles for allocation by a source serving node. The control apparatus may furthermore be configured to transmit an identifier associated with the group of random access channel preambles to the source serving node such that the source serving node is able to allocate at least one from the group of random access channel preambles, in response to determining a handover from the source serving node to a target serving node without further communicating with the serving node.

It is understood that the serving node may be configured to only provide data offloading with a user equipment. Furthermore the source serving node may be configured to provide a radio-signalling connection with a user equipment being served by the source serving node.

Dual connectivity (DC) is a mode of operation of a UE in a connected (RRC_CONNECTED) mode, and configured to use a Master Cell Group (MCG) and a Secondary Cell Group (SCG). Thus in dual connectivity the configured set of serving cells for a UE consists of two subsets: the Master Cell Group (MCG) containing the serving cells of the MeNB (Master eNB), and the Secondary Cell Group (SCG) containing the serving cells of the SeNB (Secondary eNB).

Figure 4:
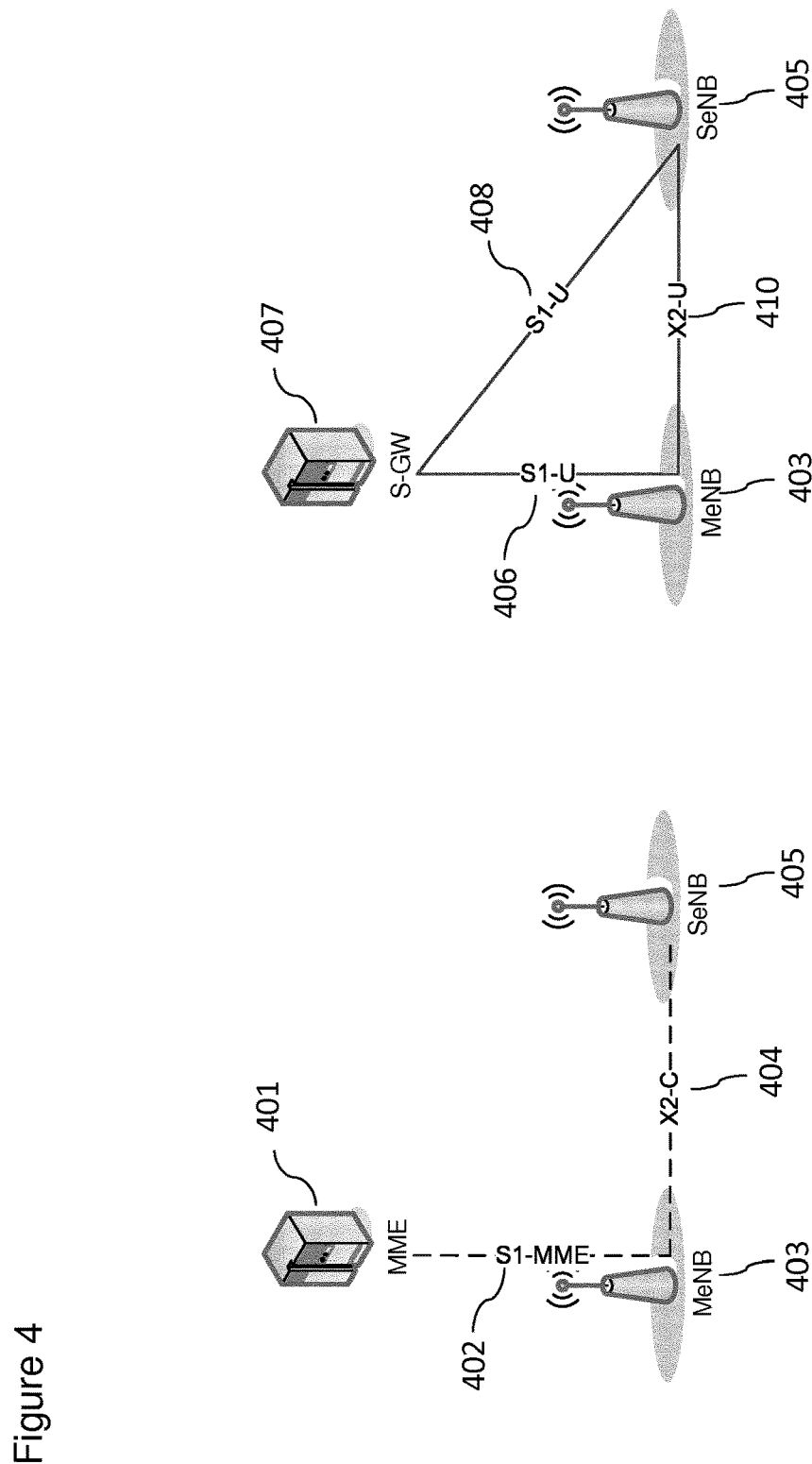
FIG. 4 shows a schematic view of the C-plane and U-plane protocols for dual connectivity communications.

FIG. 4 for example shows the control (C-plane) and user (U-plane) architecture for dual connectivity, respectively. The control plane is shown with respect to the mobility management entity (MME) 401, the MeNB (Master eNB) 403, and the SeNB (Secondary eNB) 405. In the control plane the MME 401 and the MeNB 403 may be configured to communicate control plane information using a S1-MME interface 402. The MeNB 403 and the SeNB 405 may further be configured to communicate control plane information between themselves using a X2-C interface 404.

The user plane architecture is shown with respect to the serving gateway (S-GW) entity 407, the MeNB (Master eNB) 403, and the SeNB (Secondary eNB) 405. In dual connectivity, there may be three types of bearer. For MCG bearers, the MeNB 403 is U-plane connected to the S-GW 407 via a S1-U interface 406 and the SeNB 405 is not involved in the transport of user plane data. For split bearers, the MeNB 403 is U-plane connected to the S-GW 407 via a S1-U interface 406 and in addition, the MeNB 403 and the SeNB 405 are interconnected via s X2-U interface 410. For SCG bearers, the SeNB 405 is directly connected with the S-GW 407 via s S1-U interface 408.

Handover in dual connectivity may allow Inter-MeNB handover while keeping the same SeNB. When this handover is allowed the handover procedure may involve at a high level the following operations Handover preparation at Target MeNB.

Handover preparation at Target SeNB (In other words the same SeNB)

Handover execution from Source MeNB

The handover preparation step for the SeNB is currently required even when the same SeNB remains after handover because the SeNB is informed of the new security keys (S-KeNB) when the SCG bearer exists. Furthermore the handover preparation operation is implemented as the SeNB is informed about the new endpoints for forwarding the user data. Furthermore for synchronised reconfiguration, the SeNB provides random access channel (RACH) preambles to be included in the RRC Reconfiguration message.

It is be understood that the forwarding of UP (User Plane) information and security key (S-KeNB) information can be sent to the SeNB as part of SeNB-Release-Request from the Source MeNB (the current MeNB). However, the RACH Preamble should be allocated by the SeNB. Thus a Handover execution step has to wait for the handover preparation at the SeNB in order to complete.

The intra-MeNB handover scenario without changing SeNB is already specified in standards such as TS36.300. However, the message sequence described therein involves a SeNB-Modification procedure with a SeNB to be completed before sending the handover message to the UE. In summary, the same bottleneck related to the handling and distribution of RACH preambles exists.

The concept of the embodiments described in further detail hereafter is to reserve a set or group of RACH Preambles at the SeNB for allocation by MeNB. In such embodiments both the MeNB and the SeNB know of this reservation. For example the set or group of RACH preambles may be identified and communicated between the SeNB and the MeNB via X2 interface messages. When these resources are identified via the X2 interface messages, the SeNB can be configured to mark the reserved preamble as being used when the first dual connectivity (DC) connection is established. Furthermore the reserved preambles can be automatically released on release of the last dual connectivity (DC) connection.

The SeNB may furthermore update the RACH preamble list when first dual connectivity (DC) connection is setup.

In some embodiments the set or group of RACH preambles may be identified and communicated between the SeNB and the MeNB during an operations, administration and management (OAM) configuration operation.

In such embodiments during an intra-MeNB or inter-MeNB handover scenario involving keeping the same SeNB, the MeNB (or source MeNB (S-MeNB)) may allocate the RACH preamble for the secondary cell group (SCG) Mobility-Info and inform the target MeNB (T-MeNB) in the inter-MeNB case or include the information in the radio resource channel (RRC) message in intra-MeNB case. In such a manner such embodiments avoid the need to wait for a SeNB response before sending the Handover command to the UE.

Furthermore in such embodiments on completion of the handover procedure, the RACH Preamble may be released at the MeNB so that it can be used for other handover procedures.

When the random access (RA) resource is not available at the time of triggering handover, the SCG Mobility-Info information message does not include any RACH information. In this case, the UE triggers contention based RACH access.

Figure 5:
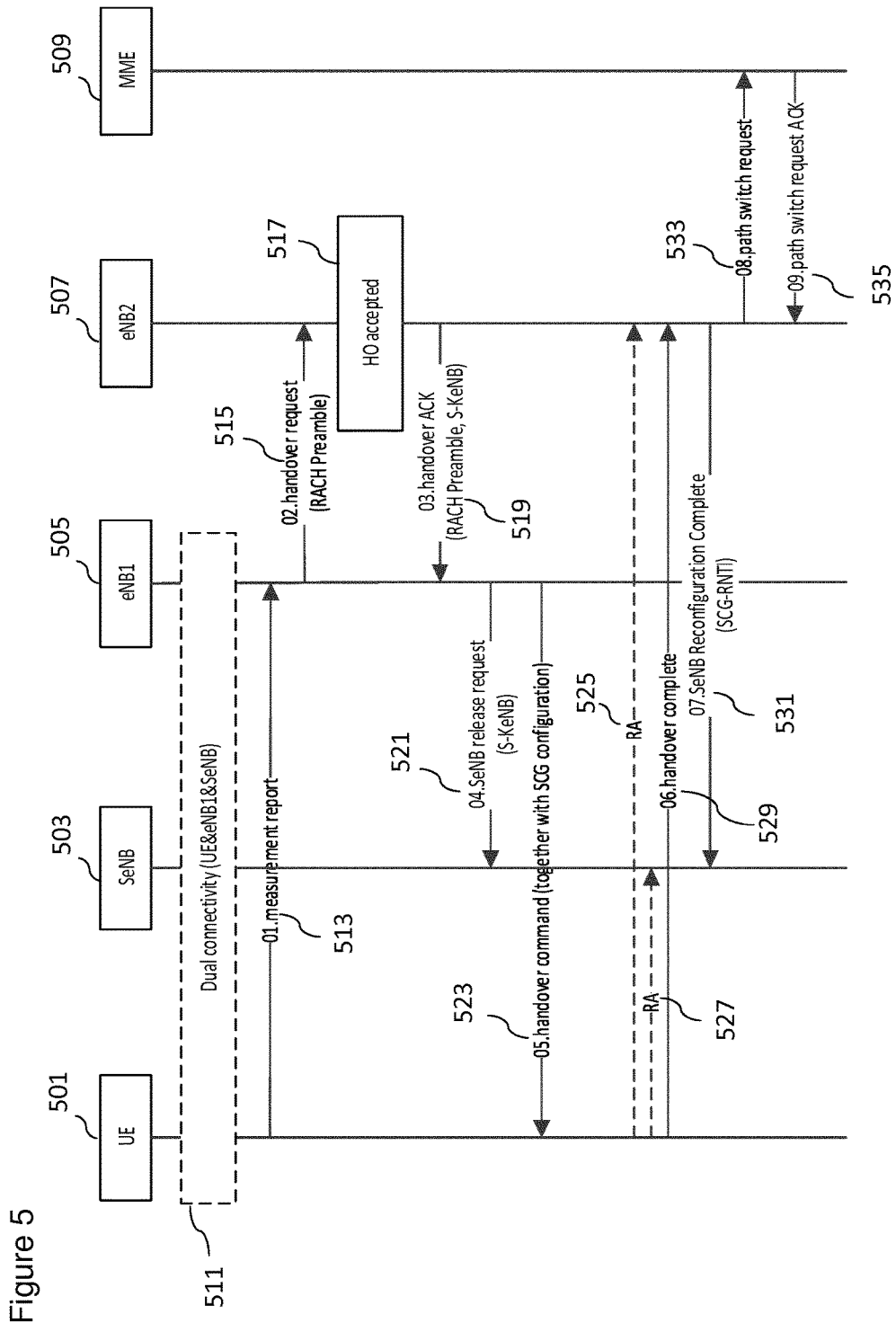
FIG. 5 shows a schematic flow diagram of the handover procedure for dual connectivity communications according to some embodiments.

With respect to FIG. 5 an example handover procedure between a source master eNB S-MeNB (eNB1) 505 and a target master eNB T-MeNB (eNB2) 507 is shown. The handover procedure is described with respect to the user equipment (UE) 501, a secondary eNB (SeNB) 503, the first or source master eNB (eNB1) 505, the second or target master eNB (eNB 2) 507 and a mobility management entity (MME) 509.

Initially the dual connectivity relationship is shown defined between the UE 501, the S-MeNB or eNB1 505, and the SeNB 503. As part of the configuration of the dual connectivity relationship the SeNB 503 may be configured to reserve a set or group of RACH Preambles for allocation by the S-MeNB. In some embodiments the set or group of RACH preambles may be identified and communicated between the SeNB and the MeNB via X2 interface messages or during an operations, administration and management (OAM) configuration operation.

The 'dual connectivity' operation is shown in FIG. 5 by step 511.

The user equipment (UE) 501 may be configured to generate measurement reports and transmit the measurement reports to the source master eNB (eNB1) 505.

The operation of transmitting the measurement reports from the UE to the eNB1 is shown in FIG. 5 by step 513.

The source master eNB (eNB1) 505 may be configured to receive the measurement report and determine that a handover between master eNBs (without changing secondary eNB) is required. The eNB1 505 may then be configured to generate and transmit a handover request message to the target master eNB (eNB2) 507. The handover request message may for example include the RACH preamble to be used for SCG-mobility from the reserved list of RACH preambles without any communication to the SeNB upon handover.

The operation of transmitting the handover request message from eNB1 to eNB2 including the RACH preamble from the reserved list is shown in FIG. 5 by step 515.

The target master eNB (eNB2) 507 may accept the handover request and start the operations associated with handover.

The operation of accepting the handover request at eNB2 is shown in FIG. 5 by step 517.

The target master eNB (eNB2) 507 may for example be configured to generate a handover acknowledgement message. It is to be noted that the target master eNB may be configured to decide to include the same secondary cell group (SCG) after handover. In such embodiments as the target master eNB has all the required information for SCG allocation including the RACH preamble, there is no requirement to communicate with the SeNB (which is a requirement in conventional handover procedures). The handover acknowledgement message may then be transmitted to the source eNB (eNB1) 505. The handover acknowledgement message from eNB2 507 may include the RACH Preamble as part of the RRC-Reconfiguration message to eNB1. Furthermore eNB2 507 may also include in the Handover-Acknowledgement message the generated security key S-KeNB.

The operation of transmitting a handover acknowledgement message from eNB2 to eNB1 is shown in FIG. 5 by step 519.

The source master eNB (eNB1) 505 may then be configured to generate a SeNB release request message. The SeNB release message may then be transmitted to the SeNB 503. Within the SeNB release request message may be the security key S-KeNB received from the target master eNB (eNB2) 507. The release-request may also include the allocated RACH preamble, so that the SeNB knows UE arrival on reception of preamble itself. The release request message may thus be used to indicate that the MeNB is about to be switched.

The operation of transmitting the SeNB release request message from eNB1 to SeNB is shown in FIG. 5 by step 521.

Furthermore the source master eNB (eNB1) 505 may be configured to generate a handover command. The handover command may be transmitted to the user equipment (UE) 501. The handover command may furthermore comprise the secondary cell group (SCG) configuration information.

The operation of transmitting the handover command together with the SCG configuration information is shown in FIG. 5 by step 523.

The user equipment (UE) 501 may be configured to receive the handover command and then detach from the old cell (eNB1) and synchronise to the new cell (eNB2).

The operation of detaching from eNB1 and synchronising to eNB2 is shown by the dashed radio access lines shown in FIG. 5 as steps 525 and 527.

Furthermore the user equipment may be configured to generate a handover complete message. The handover complete message may be transmitted to target master eNB (eNB2) 507.

The operation of transmitting the handover complete message from the UE 501 to the eNB2 507 is shown in FIG. 5 by step 529.

The target master eNB (eNB2) 507 may then be configured to transmit a reconfiguration complete message to the secondary eNB (SeNB) 505. The Reconfiguration-complete message may include secondary cell group radio network temporary identifier (SCG-RNTI) so that UE may be identified.

The operational transmitting the reconfiguration complete message from the eNB2 507 to the SeNB 503 is shown in FIG. 5 by step 531.

Furthermore the target master eNB (eNB 2) 507 may be configured to generate a path switch request message. The path switch request message may be transmitted to the MME 509.

The operation of transmitting the path switch request message from the eNB2 507 to the MME 509 is shown in FIG. 5 by step 533.

The mobility management entity (MME) 509 may receive the path switch request message. As well as informing the serving gateway to modify the bearer (and receiving the modified bearer information) the MME may be configured to generate a path switch request acknowledgement message. The path switch request acknowledgement message may then be transmitted to the target master eNB (eNB2) 507.

The operation of transmitting the path switch request acknowledgement message is shown in FIG. 5 by step 535.

An Intra-MeNB handover may be handled in a similar manner to the Inter-MeNB handover described with respect to FIG. 5. Thus for example when an Intra-MeNB handover is triggered the MeNB may be configured to indicates the SeNB Modification Request to the SeNB with the new security key (S-KeNB). This for example may be included within a SeNB release request message from the MeNB to the SeNB. Furthermore the MeNB may be configured to send any radio resource control (RRC) Reconfiguration message including the RA resource from the reserved resources without waiting for SeNB Modification response.

In both the intra and the inter MeNB handover cases, the MeNB may be configured to release the RA resource allocated on completion of the handover process.

As the SeNB typically handles fewer numbers of UE compared to the MeNB, the reservation of a few RACH preambles for MeNB allocation should not cause any resource issues. Furthermore in some embodiments when more than one MeNB is connected to a SeNB in an overlapping region then the resource reservation should be done for each of the MeNBs separately.

Thus in implementations of the embodiments described herein the handover procedure may be speeded up and may be performed without waiting for a response from the SeNB for contention-free random access. Furthermore such implementations may reduce the risk of radio link failure during the handover procedure because the handover procedure can be completed faster as it skips any steps related to handover (HO) preparation at the SeNB. Similarly X2AP signalling overhead may be reduced in such implementations of the embodiments described herein.

This is by implementing an alternative mechanism for providing the RACH preamble for SCG access from the MeNB itself with the RACH preambles of SCG reserved at MeNB, then a handover procedure can be completed without the need to wait for a response from the SeNB. Thus in the Inter-MeNB handover situation, the SeNB addition procedure can be skipped completely. For the intra-MeNB handover the RRC message can be sent without waiting for SeNB modification response from the SeNB. This makes the whole handover procedure faster and avoids any radio-link failure due to additional delay in handover procedure.

It should be understood that each block of the flowchart of FIG. 5 and any modification thereof may be implemented by various means or their combinations, such as hardware, software, firmware, one or more processors and/or circuitry.

An example of an apparatus comprises: means for receiving at a source serving node an identifier associated with a group of random access channel preambles for allocation by the source serving node, the group of random access channel preambles having been reserved at a serving node from available random access channel preambles for the serving node; means for allocating at least one from the group of random access channel preambles, in response to determining a handover from the source serving node to a target serving node; and means for transmitting a message to the target serving node, the message comprising the at least one from the group of random access channel preambles.

The receiving means may comprise means for receiving from the target serving node a response message from the target serving node, the response message comprising a security key; and transmitting the security key to the serving node.

The receiving means may comprise means for receiving the identifier within an operations, administration and management configuration message.

The receiving means may comprise means for receiving the identifier within an X2 interface message from the serving node.

A further example of an apparatus comprises: means for reserving from available radio resources for a serving node a group of random access channel preambles for allocation by a source serving node; and means for transmitting an identifier associated with the group of random access channel preambles to the source serving node such that the source serving node is able to allocate at least one from the group of random access channel preambles, in response to determining a handover from the source serving node to a target serving node without further communicating with the serving node.

The transmitting means may comprise means for transmitting the identifier within an operations, administration and management configuration message.

The transmitting means may comprise means for transmitting the identifier within an X2 interface message from the serving node.

The apparatus may further comprise means for determining a dual connectivity mode of operation for a user equipment, the user equipment configured to use the serving node as a secondary node of connectivity and the source serving node as a master node of connectivity.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as described above by means of the Figures may be implemented by computer software executable by a data processor, at least one data processing unit or process of a device, such as a base station, e.g. eNB, or a UE, in, e.g., the processor entity, or by hardware, or by a combination of software and hardware. Computer software or program, also called program product, including software routines, applets and/or macros, may be stored in any apparatus-readable data storage medium or distribution medium and they include program instructions to perform particular tasks. An apparatus-readable data storage medium or distribution medium may be a non-transitory medium. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments described above in relation to the FIGS. 1 to 7 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
   receiving at a source serving node from a serving node an identifier associated with a group of random access channel preambles for allocation by the source serving node, the group of random access channel preambles having been reserved at the serving node from available random access channel preambles for the serving node;
   allocating at the source serving node at least one from the group of random access channel preambles, in response to determining a handover from the source serving node to a target serving node without further communicating with the serving node; and
   transmitting by the source serving node a message to the target serving node, the message comprising the at least one from the group of random access channel preambles.

2. The method as claimed in claim 1, further comprising:
   receiving from the target serving node a response message, the response message comprising a security key; and
   transmitting the security key to the serving node.

3. The method as claimed in claim 1, wherein receiving at the source serving node the identifier comprises receiving the identifier within an operations, administration and management configuration message.

4. The method as claimed in claim 1, wherein receiving at the source serving node the identifier comprises receiving the identifier within an X2 interface message from the serving node.

5. The method as claimed in claim 1, wherein the serving node is a secondary enhanced node B within a secondary cell group.

6. The method as claimed in claim 1, wherein the source serving node is a source master enhanced node B and the target serving node is a target master enhanced node B, both of which being within a master cell group.

7. The method as claimed in claim 1 wherein the handover is an inter master enhanced node B handover or an intra master enhanced node B handover.

8. The method as claimed in claim 1, further comprising determining a dual connectivity mode of operation for a user equipment, the user equipment configured to use the serving node as a secondary node of connectivity and the source serving node as a master node of connectivity.

9. A method comprising:
reserving at a serving node from available radio resources for the serving node a group of random access channel preambles for allocation by a source serving node; and
transmitting by the serving node an identifier associated with the group of random access channel preambles to the source serving node such that the source serving node is able to allocate at least one from the group of random access channel preambles, in response to determining a handover from the source serving node to a target serving node without further communicating with the serving node.

10. The method as claimed in claim 9, wherein transmitting the identifier associated with the group of random access channel preambles to the source serving node comprises transmitting the identifier within an operations, administration and management configuration message.

11. The method as claimed in claim 9, wherein transmitting the identifier associated with the group of random access channel preambles to the source serving node comprises transmitting the identifier within an X2 interface message from the serving node.

12. The method as claimed in claim 9, wherein the serving node is a secondary enhanced node B within a secondary cell group.

13. The method as claimed in claim 9, wherein the source serving node is a source master enhanced node B and the target serving node is a target master enhanced node B, both of which being within a master cell group.

14. The method as claimed in claim 9 wherein the handover is an inter master enhanced node B handover or an intra master enhanced node B handover.

15. The method as claimed in claim 9, further comprising determining a dual connectivity mode of operation for a user equipment, the user equipment configured to use the serving node as a secondary node of connectivity and the source serving node as a master node of connectivity.

16. An apparatus, said apparatus comprising at least one processor and at least one memory including computer code for one or more programs, the at least one memory and the computer code configured, with the at least one processor, to cause the apparatus at least to:
receive at a source serving node from a serving node an identifier associated with a group of random access channel preambles for allocation by the source serving node, the group of random access channel preambles having been reserved at the serving node from available random access channel preambles for the serving node;
allocate at the source serving node at least one from the group of random access channel preambles, in response to determining a handover from the source serving node to a target serving node without further communicating with the serving node; and
transmit by the source serving node a message to the target serving node, the message comprising the at least one from the group of random access channel preambles.

17. The apparatus as claimed in claim 16, further caused to: receive from the target serving node a response message, the response message comprising a security key; and transmit the security key to the serving node.

18. An apparatus, said apparatus comprising at least one processor and at least one memory including computer code for one or more programs, the at least one memory and the computer code configured, with the at least one processor, to cause the apparatus at least to:
reserve at a serving node from available radio resources for the serving node a group of random access channel preambles for allocation by a source serving node; and
transmit by the serving node an identifier associated with the group of random access channel preambles to the source serving node such that the source serving node is able to allocate at least one from the group of random access channel preambles, in response to determining a handover from the source serving node to a target serving node without further communicating with the serving node.

19. The apparatus as claimed in claim 18, wherein the apparatus is further caused to determine a dual connectivity mode of operation for a user equipment, the user equipment configured to use the serving node as a secondary node of connectivity and the source serving node as a master node of connectivity.

* * * * *